Patented Oct. 16, 1951

2,571,940

UNITED STATES PATENT OFFICE 2,571,940

OXAZOLINES

Karl Pfister, III, Scotch Plains, and Max Tishler, Westfield, N. J., assignors to Merck & Co., Inc., Rahway, N. J., a corporation of New Jersey No Drawing. Original application January 26, 1946, Serial No. 643,751. Divided and this application September 16, 1947, Serial No. 774,426

3 Claims. (Cl. 260—307)

This application is a division of our co-pending application, Serial No. 643,751, filed January 26, 1946, now U. S. Patent No. 2,446,192.

This invention relates to the preparation of amino acids from readily available starting materials. More particularly, it is concerned with a new and improved process for manufacturing the amino acid threonine from allothreonine and from derivatives of allothreonine.

Allothreonine and threonine are isomers differing only in their stereochemical relationship, i. e. the spatial relationship of the atoms comprising the molecules. Our process is applicable regardless of the optical rotation of the particular allothreonine or allothreonine derivative which is selected as the starting material. It is also applicable in the treatment of inactive compounds such as racemic mixtures.

Methods now available for the preparation of the essential amino acid threonine are generally unsatisfactory in that the yield is predominantly allothreonine and not threonine. Thus, the method of Carter and West, as published in Organic Syntheses, vol. 20, page 101 (1940), involves aminating an α-bromo-β-methoxy-butyric acid mixture which is approximately 40% precursor of dl-threonine and 60% precursor of dl-allothreonine. The dl-threonine is isolated in the pure state in about 17.5% yield by formylation and fractional crystallization. Similarly, the method of West et al., as disclosed in Jour. Biol. Chem., vol. 122, page 605 (1938), gives less than 5% of threonine, the yield of allothreonine being very high.

While dl-allothreonine may be converted to dl-threonine by the method of Carter et al., Jour. Biol. Chem., vol. 129, page 362 (1930), this method gives very poor yields and is relatively expensive to operate. It involves a deep-seated destruction of the dl-allothreonine molecule, which is later resynthesized to obtain a dl-threonine derivative. As contrasted with this, the process herein disclosed brings about a high conversion of allothreonine and its derivatives to threonine, all intermediates being true derivatives of allothreonine. The process therefore does not involve destruction and resynthesis of the allothreonine molecule.

It is, accordingly, one of the objects of our invention to provide a method for converting allothreonine to threonine, or for converting suitable derivatives of allothreonine to threonine, which method is efficient in its operation, and results in high yields of the desired threonine.

Another object of our invention is to provide a method for producing threonine from allothreonine, or derivatives thereof, which method does not involve destruction and resynthesis of the threonine molecule. Such destruction and resynthesis is characteristic of some of the methods now available for producing this important amino acid.

The foregoing aims and objectives of this invention, as well as others subsequently explained herein, will be apparent from the ensuing disclosure of certain preferred embodiments of our invention.

We have found that allothreonine derivatives of the type

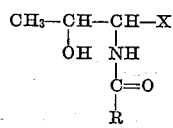

where R represents hydrogen, alkyl, aryl, aralkyl, alkoxy, aryloxy, or aralkoxy; and X represents COOR', CN, or

R' and R'' representing an alkyl group, an aryl group, or an aralkyl group, may be converted to the amino acid, threonine, by the following process. The allothreonine derivative is treated with a cyclizing and dehydrating agent to form the oxazoline derivative of the type:

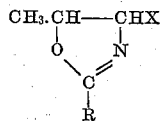

Among suitable cyclizing and dehydrating agents may be mentioned phosphorus pentachloride, phosphorus trichloride, phosphorus pentoxide, and thionyl chloride. Ordinarily we prefer to use thionyl chloride because of the ease of manipulation and the readiness with which cyclization occurs, although the other cyclizing and dehydrating agents specified are also suitable. The formation of the oxazoline derivative may be carried out at room temperature or above, but high temperatures are not necessary.

If desired the oxazoline derivative may be isolated at this stage by precipitating it from the solution in the form of its mineral acid salt, such as the hydrochloride or sulfate, by the addition of an organic precipitant such as ether. Its isolation is not essential, however, as it may be readily converted in solution to threonine by hydrolysis. This hydrolysis, which may be carried out either in one operation, or stepwise, may be effected in either acid or alkaline solution. Ordinarily we prefer to carry out the hydrolysis by boiling the solution in a dilute mineral acid since it results in a high yield and the reaction proceeds substantially quantitatively in one direction. In carrying out alkaline hydrolysis it is desirable to use a strong alkali such as 2.5 N sodium hydroxide solution.

Derivatives of allothreonine of the type:

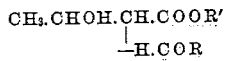

where R represents hydrogen, alkyl, aryl, aralkyl, alkoxy, aryloxy, or aralkoxy, and R' represents an alkyl, an aralkyl group, or an aryl group, may be converted to the amino acid, threonine, by the process described, certain additional details of which may be given as follows. The allothreonine derivative is treated, as above, with a cyclizing and dehydrating agent, such as phosphorus pentachloride, phosphorus trichloride, phosphorus pentoxide, or thionyl chloride. Thionyl chloride is preferred. This step results in the formation of an oxazoline derivative of the type:

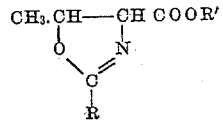

where R and R' represent the radicals specified above.

The oxazoline derivative resulting from cyclization and dehydration of the allothreonine derivative may be isolated at this stage if desired. This may be accomplished by precipitating it from the solution in the form of its mineral acid salt, such as the hydrochloride or sulfate, by the addition of an organic precipitant such as ether. However, isolation at this stage is not necessary, unless it is desired to recover the oxazoline compound itself, as it may be readily converted while in solution to threonine in the subsequent hydrolysis.

The hydrolysis of the oxazoline derivative may as in the general reaction above described, be carried out either in one operation, or stepwise. Ordinarily, it is preferred to carry out the hydrolysis by boiling the solution with a dilute mineral acid. Acid hydrolysis is satisfactory in that it results in a high yield, proceeding substantially quantitatively in one direction. However the hydrolysis may also be carried out in alkaline solution by the use of a strong alkali such as 2.5 N sodium hydroxide solution.

The overall reaction, taking thionyl chloride as illustrative of the dehydrating and cyclizing agent, may be represented as follows:

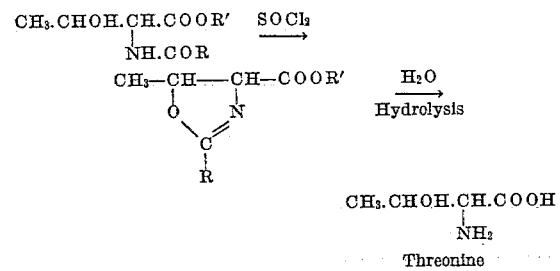

It is believed that the mechanism of the above transformation involves the inversion of the β-hydroxyl group, probably occurring during the oxazoline formation. It is obvious that the carboxyl group must be masked, for the free acid (N-acyl allothreonine), under dehydrating conditions, does not form oxazolines but instead loses the elements of water and methanol to form an azlactone (see Carter et al., Organic Syntheses 20, 101 (1940)). This chemical change may be represented as follows:

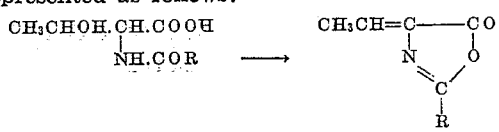

where R represents alkyl, aryl, aralkyl, alkoxy, aryloxy or aralkoxy.

Although in the examples of our process given below the carboxyl group of the allothreonine derivatives is protected as an ester group to prevent azlactone formation, it is evident that the desired inversion may also be readily accomplished by replacing the carboxyl group of the allothreonine or allothreonine derivative by CN, by

or by any other group capable of being converted into a carboxyl group by hydrolysis. R'' represents an alkyl, aryl, or aralkyl group.

The following examples illustrate our invention.

*Example 1*

N-benzoyl-dl-allothreonine was converted to its methyl ester by conventional means. 2.37 grams of this ester were added portionwise to 6 milliliters of ice cold thionyl chloride. The mixture was allowed to stand at room temperature for about 2 hours, and then poured into 150 milliliters of anhydrous ether to isolate 2-phenyl-5-methyl-4-carbomethoxyoxazoline hydrochloride. The compound had a melting point of 117–118° C. Its composition was proven by carbon and hydrogen analyses.

2 grams of 2-phenyl-5-methyl-4-carbomethoxyoxazoline hydrochloride as above prepared were refluxed for 3 hours with 20 milliliters of 10% hydrochloric acid. The reaction mixture was cooled by the application of ice, and the precipitated benzoic acid removed by filtration. The filtrate was concentrated to dryness and the residue dissolved in water. It was assayed for its dl-threonine content microbially. The yield of the desired amino acid was found to be 96.7%.

Two-thirds of the bioassay solution were concentrated to dryness, dissolved in alcohol, and reconcentrated. The residue was taken up with 15 milliliters of alcohol and concentrated ammonia added thereto until it was alkaline to litmus. It was refrigerated overnight and the precipitate filtered off and recrystallized from aqueous alcohol. The yield was 70.1% of the theoretical, and the product had a melting point of 229–230° C. Upon bioassay the sample proved to be 100% dl-threonine. Its composition was substantiated by carbon, hydrogen and nitrogen determinations.

*Example 2*

9.46 grams (0.05 mole) of the ethyl ester of N-acetyl-dl-allothreonine were dissolved in 15 milliliters of benzene. The solution was cooled to 15° C. and treated with 8 milliliters of thionyl chloride, which was added over a period of 20 minutes, the temperature during this time being held at 13–16° C. The solution was then allowed to reach a temperature of 30° C., and stirred at that temperature for 1–1½ hours. It was then poured into 30 milliliters of ice water, the benzene layer removed, and the aqueous layer containing the 2-methyl-5-methyl-4-carboethoxy-oxazoline was refluxed for 2½ hours. It was then concentrated to dryness on an aspirator, and dissolved in water for bioassay analysis. The yield of dl-threonine was found to be 94.6% of the theoretical.

*Example 3*

2 - phenyl-5-methyl-4-carbomethoxyoxazoline hydrochloride was prepared as described in Example 1. 1.28 grams (0.005 mole) of 2-phenyl-5-methyl-4-carbomethoxyoxazoline hydrochloride were refluxed for one hour in 10 milliliters of water. The resulting solution was concentrated to dryness on the aspirator, chloroform added thereto, and then reconcentrated to dryness. The final step was carried out by the use of an oil pump and water bath. The dry product was then dissolved in 10 milliliters of chloroform, treated with decolorizing carbon, filtered and the product precipitated from the solution by the addition of 20 milliliters of anhydrous ether. By reprecipitation from chloroform O-benzoyl-dl-threonine methyl ester hydrochloride, having a melting point of 155–156° C., was secured.

This compound was hydrolyzed by boiling for 3 hours with 3 milliliters of 10% hydrochloric acid. This step was followed by concentration and dissolving in water, the resulting solution being diluted to 25 milliliters for bioassay. The product was found to be dl-threonine, and the yield equivalent to 88% of the theoretical.

*Example 4*

The 2-phenyl-5-methyl-4-carbomethoxyoxazoline hydrochloride was prepared as described in Example 1. This was then hydrolyzed in alkaline solution to form dl-threonine.

In carrying out the hydrolysis, the 2-phenyl-5 - methyl - 4 - carbomethoxyoxazoline hydrochloride (2.0 g.) was refluxed for 4 hours with 20 milliliters of 2.5 N sodium hydroxide solution. The solution was then cooled and acidified with 4 milliliters of concentrated hydrochloric acid. After overnight refrigeration, the benzoic acid was filtered off, and the filtrate concentrated on an aspirator to dryness. This filtrate was then redissolved in water and reconcentrated. The residue was then dissolved in water again, and diluted to 100 milliliters volume for bioassay. The product was dl-threonine in yield equivalent to 26.7% of the theoretical.

*Example 5*

A suspension of 11.3 grams (0.095 mole) of dl-allothreonine in 50 milliliters of ethanol (dried over calcium oxide) was cooled and dry hydrogen chloride gas introduced until a clear solution resulted. The reaction mixture was then refluxed for one hour and concentrated to dryness under reduced pressure. This formed the hydrochloride of the ethyl ester of dl-allothreonine, which crystallized rapidly.

16.5 grams (0.09 mole) of the ethyl ester of dl-allothreonine hydrochloride was dissolved in 20 milliliters of water and cooled to −20° C. The solution was neutralized to substantial neutrality by the addition of 9 milliliters of 10 N sodium hydroxide solution (0.09 mole NaOH). To the solution there was then added, alternately, methyl chlorocarbonate and solid sodium carbonate until 10.8 grams and 6.1 grams respectively had been added. This amount was equivalent to 0.114 mole of each. The mixture was stirred mechanically and cooled to 0° C. during the entire addition. The stirring was continued until no more carbon dioxide was evolved, and the opaque mass was then extracted with ether. The ethereal extract was washed with sodium carbonate and water, dried, and concentrated. This gave 9.2 grams of a pale yellow oil which was distilled under reduced pressure to yield a main fraction consisting of 5.0 grams. This fraction had a boiling point of 133–134° C. at 1–2 millimeters of mercury pressure.

This product was N-carbomethoxy-dl-allothreonine ethyl ester having the structural formula:

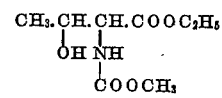

Its composition was established by carbon, hydrogen and nitrogen determinations.

0.82 gram (0.004 mole) of N-carbomethoxy-dl-allothreonine ethyl ester was then dissolved in 5 milliliters of toluene and 0.65 milliliter (0.0088 mole) of thionyl chloride added thereto. The mixture was refluxed for ½ hour, during which time the material remained colorless, but large amounts of hydrogen chloride gas were evolved. At the end of this period a slight additional amount of thionyl chloride and a small amount of pyridine were added thereto. The refluxing was continued at a temperature of about 110° C. for an additional period of ½ hour, whereupon the excess thionyl chloride was decomposed by the addition of cold water. The mixture was concentrated to dryness on an aspirator, and then hydrolyzed by refluxing for 2½ hours with 15 milliliters of 10% hydrochloric acid solution. It was again concentrated to dryness, small amounts of water being added in two batches, followed by further reconcentration to dryness. The residue was again taken up in water, the solution rendered alkaline, and then concentrated to remove any residual pyridine. The product was dl-threonine in yield approximately 21% of the theoretical.

It is apparent that our process is readily applicable for converting derivatives of allothreonine to the amino acid threonine. It is also applicable for the preparation of allothreonine derivatives starting with threonine, by forming the corresponding oxazoline which can be hydrolyzed to yield allothreonine. In fact it is generally applicable for the interconversion of disastereoisomers of any β-hydroxy-α-aminocarboxylic acids in which the α and β carbons are asymmetric. Thus, N-benzoyl threonine is readily converted to allothreonine in accordance with our method.

Various changes and modifications may be made in our process, certain preferred embodiments of which are described herein, which changes and modifications would, nevertheless, be within the scope of our invention. It is our intention that such changes and modifications, to the extent that they are within the scope of the appended claims, shall be considered as part of our invention.

We claim:
1. A stereoisomeric oxazoline characterized by two asymmetric carbon atoms and having the formula:

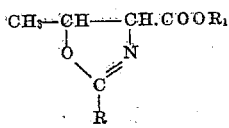

wherein $R_1$ is a lower alkyl group and R is an alkyl group; said oxazoline yielding dl-threonine upon hydrolysis.

2. A stereoisomeric oxazoline characterized by two asymmetric carbon atoms and having the formula:

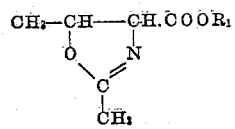

wherein $R_1$ is a lower alkyl group; said oxazoline yielding dl-threonine upon hydrolysis.

3. The stereoisomeric form of 2-methyl-5-methyl-4-carboethoxy oxazoline yielding dl-threonine upon hydrolysis.

KARL PFISTER, III.
MAX TISHLER.

REFERENCES CITED

The following references are of record in the file of this patent:

Bergmann: Berichte, vol. 56, p. 1281.
Bergmann et al.: Zeitschrift für Physiologischer Chemie, vol. 140, pp. 135–137 (1924).
Attenburron et al.: Journal Chemical Society (London), 1948, pp. 310–318.